Feb. 4, 1930.  I. J. REMARK  1,745,642
VULCANIZER
Filed Dec. 3, 1925   2 Sheets-Sheet 2

INVENTOR.
ISIDORE J. REMARK
BY
ATTORNEY.

Patented Feb. 4, 1930

1,745,642

UNITED STATES PATENT OFFICE

ISIDORE J. REMARK, OF AKRON, OHIO, ASSIGNOR TO THE GENERAL TIRE & RUBBER COMPANY, OF AKRON, OHIO, A CORPORATION OF OHIO

VULCANIZER

Application filed December 3, 1925. Serial No. 72,885.

This invention relates to vulcanizing apparatus such as used in the manufacture of pneumatic automobile tires, and particularly to that type of apparatus in which the tire is cured between mold sections which are individually heated, being steam chambered or jacketed.

The embodiment of the invention shown herein is of the type in which there is a central stationary element, on either side of which are supported swinging mold sections so that when the vulcanizer is closed two tires can be cured simultaneously. This form of vulcanizer is referred to in the trade by the general classification of "watchcase" type of vulcanizer.

The objects of the present invention are to improve upon the mechanism for exerting pressure upon the molds to close them against the internal pressure upon the tire and for locking the molds in closed position. The apparatus is also provided with mechanism for opening the molds. A further object of the invention is to improve upon the construction of the molds so that they may be interchanged easily and quickly and afford fluid tight joints about the jacketed molds.

Other objects and advantages will be apparent to those skilled in the art to which the invention pertains, it being understood that in illustrating the invention in its preferred form, the scope thereof is not limited by the details of construction which have been shown and described, but may be varied within the substance of the claims forming a part hereof.

Figure 1:
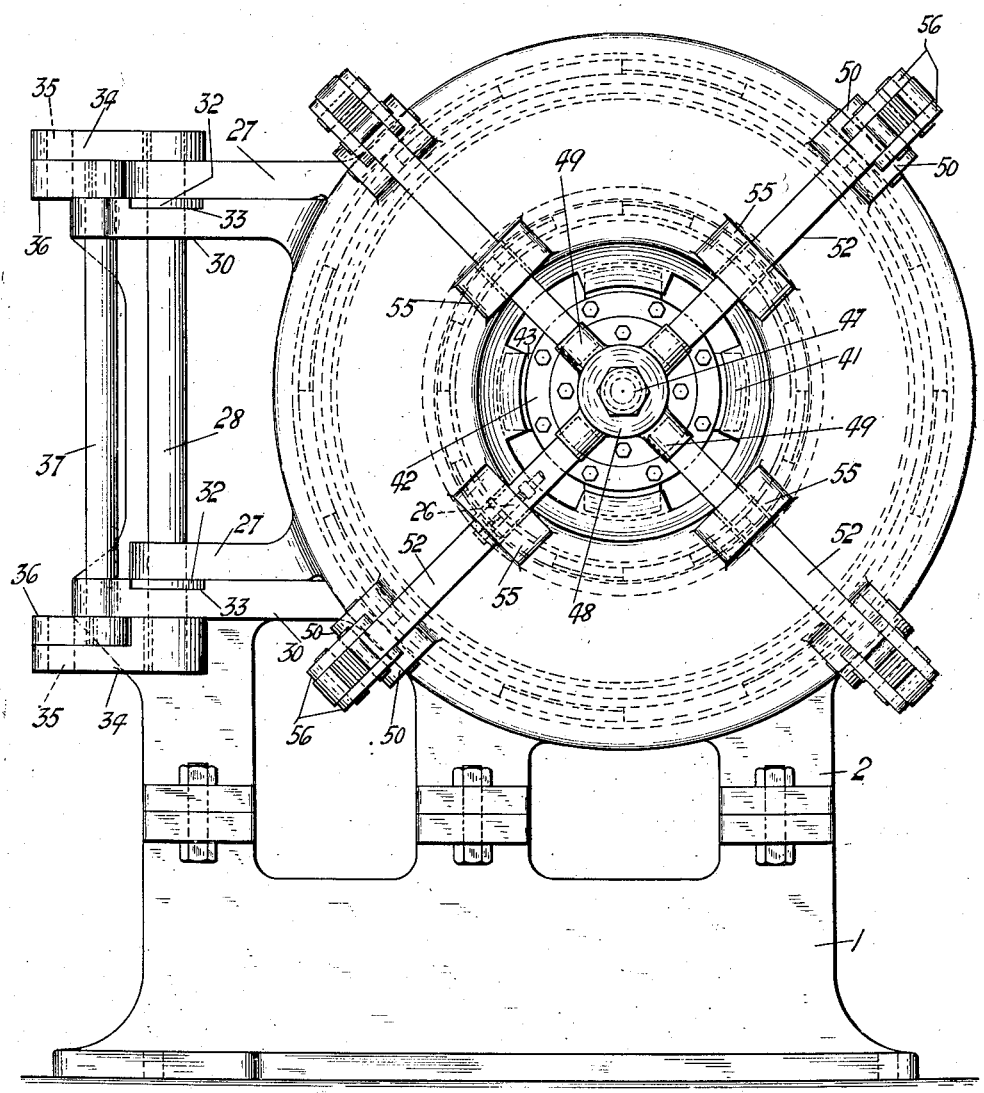
Figure 1 is a side elevation of the preferred form of the invention.

The device comprises a base or stand 1, to the upper surface of which is bolted the main casting or central mold member 2. The member 2 is formed with an annular central web 3 provided with outwardly extending parallel flanges 4, which, with the central web, form three sides of the stationary steam chambers. The flanges 4 diverge or flare outwardly for the purpose of receiving the mold plates 5, the outer surfaces of which plates are formed as half cavities for the reception of the tire casings.

The mold plates 5 fit within the cavities on the central web and are removable therefrom for the purpose of effecting changes in the tires to be molded. In order to secure an easily operated, fluid tight connection between each removable plate and its casing or holder, the sidewalls or flanges 4 are formed with segments of flanges or lugs 7, and the removable plate is provided with similar segments of flanges or lugs 8, so that the plates can be inserted axially and then rotated slightly to bring the lugs 8 beneath the lugs 7. Gaskets 10 seated in one of the members, here shown as within the walls 4, form a fluid tight joint. The construction of the removable mold plate 12 in the outer swinging section of the mold 14 is the same and need not be further described.

It will be seen, however, that an easily operated and efficient method of mounting a removable mold plate within a chambered mold has been provided, and this method of securing a mold adaptable for varying sizes of tires is superior to former methods which have been employed for this purpose.

Figures 2, 3, 4:
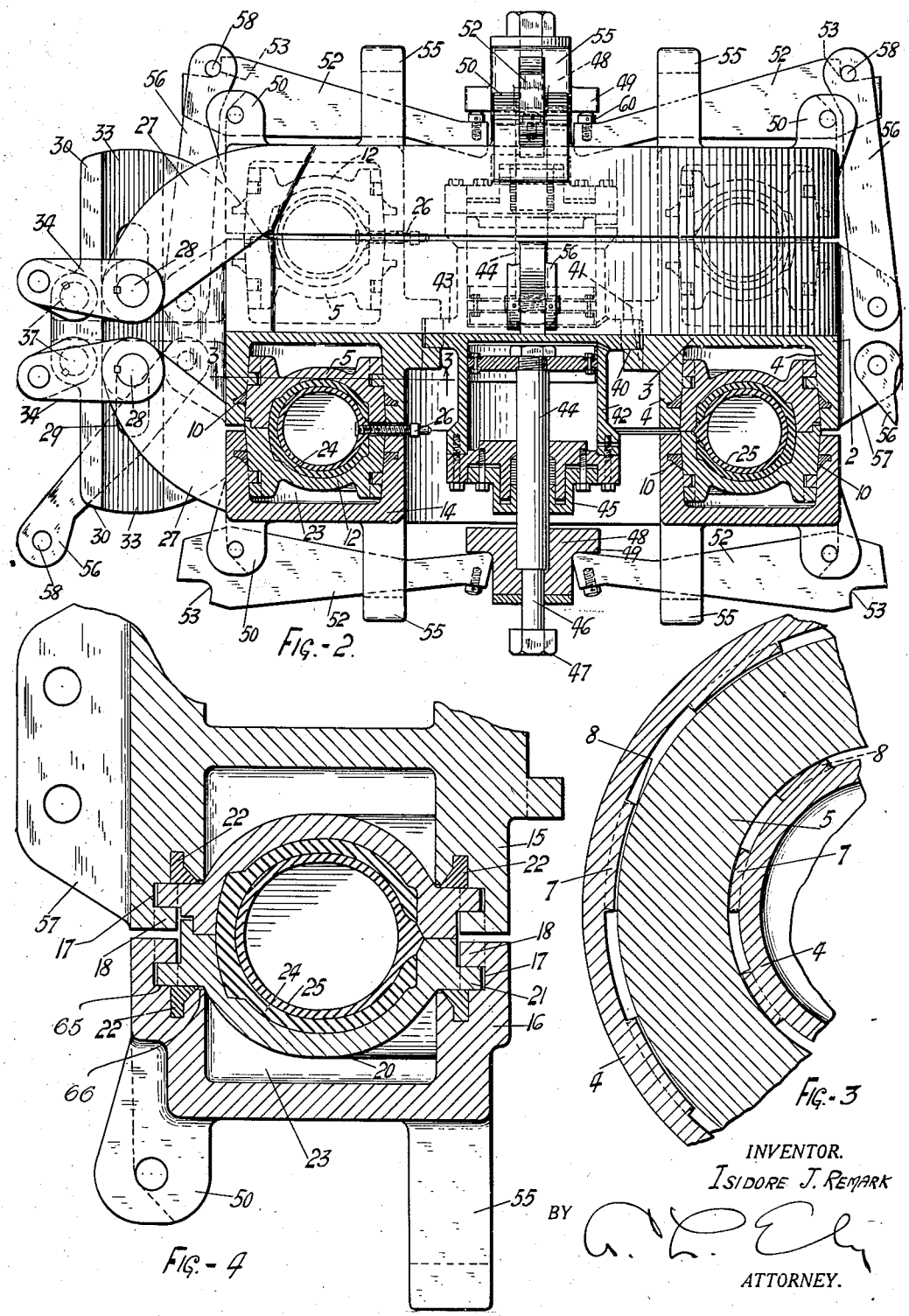
Figure 2 is a plan view, one-half of the device being shown in full lines and the other half in section, it being also noted that in the upper portion of the view the mold is locked, while in the lower portion it is in condition to be opened.
Figure 3 is a part section on the line 3—3 of Figure 2.
Figure 4 is an enlarged section of a modified form of the invention.

A modified means of securing interchangeability for the tire molds is shown in Figure 4, in which the stationary chamber is indicated at 15 and the swinging or movable chamber at 16. In this form of the invention each chambered section is formed with a slot or groove 17, over which projects the notched or segmental flange 18. The mold plates are indicated at 20 and are provided with notched or segmental flanges 21 which fit within the groove 17 and by being turned partially are brought within register with the segments 18. The packings at the inner and outer circumferences of the mold are shown at 22.

In both forms of the invention it will be observed that the removable mold plates enclose the chamber 23 through which steam is circulated for the purpose of effecting vulcanization of the tire casings 24, which are maintained under internal fluid pressure by expansible cores or air bags 25 which receive air or other fluid under pressure through the usual valve stems 26. The gaskets 10 and 22 are of the self sealing type, being provided with tapered or feather edges which are deformed by the pressure within the chambers and seal them.

In the form of the invention shown in Figure 4, the mold plates 20 rest at their outer peripheries upon surfaces 65, surrounding the gaskets 22, while the surfaces 66 interiorly of the gaskets are somewhat less in height to provide passageway from the interior of the steam chamber to the flexible lips of the gasket. This construction provides a metal to metal contact about the outer periphery of the removable plate and permits the steam pressure within the chamber to reach the surface of the gasket 22 and thereby cause it to seal the crack about the chamber.

The movable or swinging sections 14 are each carried upon arms 27, the arms being pivoted upon a hinge pin or shaft 28. Each shaft 28 is extended upon either side of the arms 27 and is received within slots 29 formed parallel with the axis of the mold within laterally extending brackets 30 formed with the casting 2. Below each arm 27 upon the shaft 28 is carried a washer 32 which rides within a guideway 33 formed on the upper surface of the bracket 30. To the ends of the shaft 28 are keyed links 34 which are pivotally connected by pins 35 to short arms 36 which are in turn keyed to a pintle 37 rotatably mounted in the bracket 30.

The construction which has just been described secures a desirable movement of the swinging sections 14 for it will be noted that the sections 14 are caused to move toward and from the stationary mold section in a straight line along the slot 29 until the hinge pins 28 reach the end of the slot, whereupon they may swing about the pivots 28. The links 34 and 36 and the pintle 37 assure a uniform movement above and below and prevent binding of the swinging arms.

The movable mold sections are clamped against the stationary mold sections and moved away from them by the mechanism to be described.

Located about the inner periphery of the main casting is the groove 40 which is bounded by the interrupted or segmental flanges 41. Mounted within the opening thus formed is a double cylinder 42, centrally formed thereon being the segmental rib 43. The cylinder is inserted and rotated until the flanges 41 and the ribs 43 are in register and may then be locked in any desired manner.

Each cylinder 42 is provided with a piston 44 which passes outwardly through the stuffing box 45 at the axis of the vulcanizer. The piston 44 is reduced at its outer extremity, as at 46, being provided with a stop 47. Arranged to slide and rotate upon the outer end of the piston is a head 48, the body of which is formed with spaced radial arms 49.

Each movable mold section is provided near its outer periphery with lugs 50, to which are pivoted radial locking arms 52, the outer ends of which are notched, as at 53, and the inner ends of which are arranged so that they will be in contact with the arms 49 on the head 48 when the latter is rotated into alignment therewith. In another position of the head, the inner ends of the arms 52 will pass through the spaces between the arms 48. The face of each movable mold section is formed with a loop or strap 55 within which the radial arms 52 may move to a limited extent. The stationary mold sections are provided with parallel swinging links 56 which are pivoted at their inner ends upon lugs 57 and are provided at their outer ends with pins 58 adapted to seat in the notches 53 when the links are brought inwardly as shown at the upper side of Figure 2.

When it is dseired to open the mold, the parts are arranged as shown in the lower portion of Figure 2, with the rotatable head on the inside of the arms 52, the piston being retracted, the arms 49 in alignment with the ends of the arms 52 and the links 56 disengaged. Pressure admitted below the piston will move the arms 52 outwardly until they strike the loops 55 whereupon the movable mold section will be forced outwardly in a straight line along the slots 29. When the mold section has moved to the outer limit of its travel in this fashion, it may then be swung upon the hinge pin 28 until the tire can be removed and another put in its place.

For clamping the mold the arrangement of the parts is as shown in the upper portion of Figure 2, in which the arms 56 are engaged with the arms 52 and the inner ends of the arms 52 are inside of and in alignment with the head 48. The inner ends of the arms 52 are preferably provided with adjustable screws 60, the heads of which are hardened to take the wear and are adjusted to compensate for variations in clamping arms. Pressure applied above the head of the piston 44 will draw the arms 52 inwardly and securely clamp the mold sections together.

The advantages of the mechanism will have been apparent to those skilled in the art and it is not necessary to detail all of them at this point. The ease with which the molds may be interchanged, together with the assured fluid tight joints obtained, will commend the device to the manufacturer. The fact that the mold sections move in a straight line both in closing and opening the mold is an advantage over the ordinary swinging type of vulcanizer. The fluid operated pressure mechanism for clamping the molds and for releasing them is an advantage over the ordinary type of device for this purpose.

Changes and modifications may be made within the scope and field of the invention, and such changes as fall therein are intended to be covered by the appended claims.

What is claimed is:

1. In a vulcanizer of the type set forth, a chambered mold section and a removable mold plate therein, the mold section and plate having a rotatable interlocking fit, the plate enclosing the cavity within the mold section for the circulation of a heating medium.

2. In a vulcanizer of the type set forth, a mold section forming three walls of a steam cavity and a removable mold plate upon the section, the mold section and plate having interrupted flanges therein to form a rotatable interlocking connection therewith and gaskets between the section and plate.

3. A tire mold comprising chambered mold sections, each section comprising a removable mold plate having a molding cavity formed in the outer face thereof, the plate having rotatable interlocking connection with the section and adapted to enclose a chamber therein for the circulation of steam.

4. A vulcanizer comprising a stationary central section having open cavities upon either side thereof and removable mold plates having rotatable interlocking connection with the central section and adapted to enclose steam cavities therein.

5. A vulcanizer having a stationary section and a movable section, a hinge pin upon which the movable section may pivot, means to guide the hinge pin in a straight line toward and from the stationary section, and means to coordinate the movement of the hinge pin at the ends thereof.

6. A vulcanizer comprising a stationary section and a section movable relatively thereto, a plurality of radially arranged levers, a pressure cylinder at the axis of the vulcanizer, a piston, an operating head upon the piston against which the inner ends of the lever are adapted to rest, and a clamp for engaging the outer ends of the levers.

7. A vulcanizer comprising a stationary section and a movable section, a cylinder arranged at the axis of the mold, a piston within the cylinder, a rotatable head upon the piston, and clamping arms pivoted to the mold and adapted to be actuated by the head to clamp the mold sections together.

8. A vulcanizer comprising a stationary section and a movable section, a cylinder arranged at the axis of the mold, a piston within the cylinder, a rotatable head upon the piston, and arms pivoted to the mold and movable to either side of the head.

9. A vulcanizer comprising a stationary section and a movable section, a cylinder arranged at the axis of the mold, a piston within the cylinder, a rotatable head upon the piston, arms pivoted to the mold and movable to either side of the head, and radial projections upon the head movable by rotation thereof to a position in alignment with the arms.

10. In a vulcanizer of the type set forth, a mold section forming three walls of a steam cavity and a removable mold plate upon the section, the mold section and plate having interrupted flanges therein to form a rotatable interlocking connection therewith and pressure sealing gaskets between the section and plate.

11. A vulcanizer comprising relatively movable annular sections, means including a thrust member extending through the central opening of the vulcanizer for clamping the sections together, means for actuating the thrust member and means on the thrust member adapted to be actuated against one of the sections as the clamping force is released to separate the vulcanizer sections.

ISIDORE J. REMARK.